Figure 1:
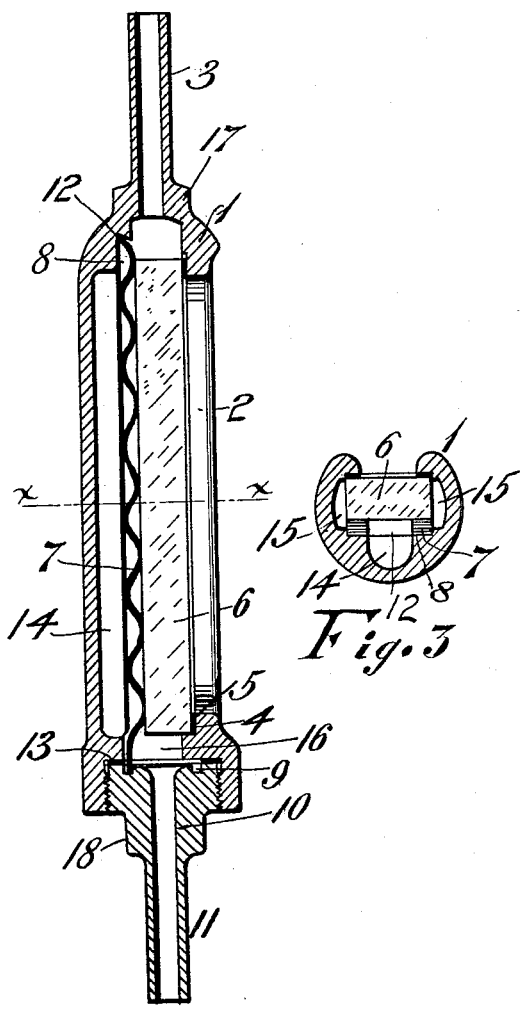

C. B. GROFF.
WATER GAGE.
APPLICATION FILED APR. 4, 1910.

1,199,006.

Patented Sept. 19, 1916.
2 SHEETS—SHEET 1.

WITNESSES:    INVENTOR
Clarence B. Groff.

ATTORNEYS.

C. B. GROFF.
WATER GAGE.
APPLICATION FILED APR. 4, 1910.
1,199,006.
Patented Sept. 19, 1916.
2 SHEETS—SHEET 2.
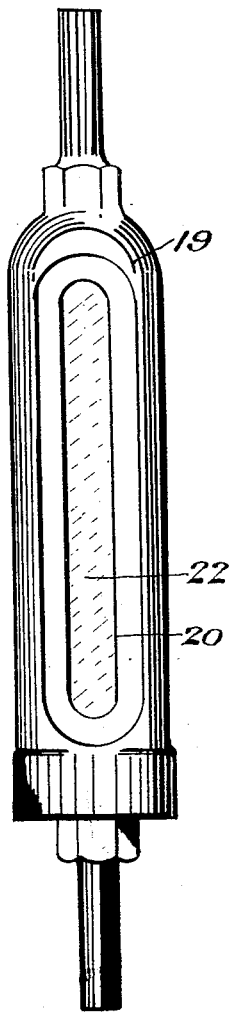
Fig. 6.
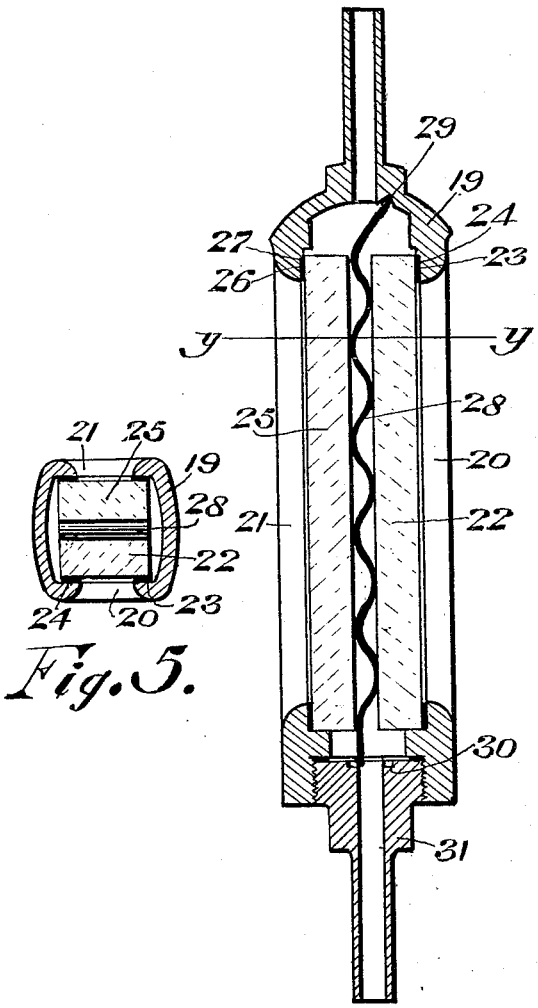
Fig. 5.
Fig. 4.
WITNESSES:
P. F. Nagle
H. G. Dieterich
INVENTOR
Clarence B. Groff
BY
Niedersheim _____
ATTORNEY.

UNITED STATES PATENT OFFICE.

CLARENCE B. GROFF, OF CAMDEN, NEW JERSEY.

WATER-GAGE.

1,199,006.  Specification of Letters Patent.  Patented Sept. 19, 1916.

Application filed April 4, 1910. Serial No. 553,387.

*To all whom it may concern:*

Be it known that I, CLARENCE B. GROFF, a citizen of the United States, residing in the city and county of Camden, State of New Jersey, have invented a new and useful Water-Gage, of which the following is a specification.

In water gages as heretofore constructed, it has been deemed essential to secure the gage frame in assembled position by the employment of bolts or studs or their equivalents in order to make a water tight joint around the gage glass, and owing to the fact that the gaskets used for sealing almost invariably vary a great deal in texture, it is necessary in order to obtain a water tight joint to place a non-uniform bending stress on the gage glass, since when the fastening devices are tightened at one place, it will be necessary to also tighten the fastening devices at the center of the joint. Under such conditions a non-uniform pressure is produced on the gage glass and as the gage glass expands, due to the rise in steam pressure, the gage glass will expand unevenly, thereby resulting in a large number of instances in the breaking of the gage glass.

In the devices heretofore employed, the water gage frames, with which I am familiar, are constructed in such a manner that only one side of the water gage glass is in contact with the hot water and steam and under such conditions, especially in extremely cold weather, owing to the impossibility of warming the entire body of the gage glass quickly enough to avoid unequal expansion and contraction, slight leaks are liable to occur at the joint, due to the shrinkage. Furthermore after the water gage frame and glass have been in service for some time and the boiler is allowed to cool, it is found that when the steam is raised again, that a shrinkage has taken place in the gasket and if the joint is a positive bolted joint, the only manner of taking up this shrinkage is by tightening all of the bolts, and since any leakage due to the shrinkage does not show until the steam pressure is on the boiler, the slight leak thus produced rapidly cuts away the entire gasket, due to the increased rapidity of flow caused by the increase in pressure back of the water. In order to stop this leak, workmen ordinarily tighten down the fastening device at the joint where the leak shows, thereby placing an unequal pressure upon the gage glass and causing it to crack.

In my present invention I have entirely overcome the defects in prior devices, to which I have hereinbefore referred, and to the above ends my present invention consists in a novel construction of a water gage wherein yielding means are employed to maintain the gage glass against its seat.

It further consists of a novel construction of a water gage, wherein yielding means are employed for retaining the water gage glass against its seat, such yielding means being adapted to be set, so as to normally exert a low pressure against the gasket, it being understood that, assuming that the predetermined pressure at which the yielding means is set is great enough to overcome the difference in pressure due to the cooled water in the boiler creating a vacuum and the atmospheric pressure when the steam pressure rises, the pressure on the gasket increases in proportion to the steam pressure and the joint remains sealed against the highest steam pressure.

It further consists of a novel construction of a water gage wherein when the gage glass expands due to the rise in steam pressure the glass is practically free to expand.

It further consists of a novel construction of a water gage, wherein the frame is preferably constructed of steel having a coating of non-oxidizing material thereon, such for example, as would be produced by copper plating the steel and then nickeling thereover, whereby it is possible to blacken or color the recess at the back of the glass by a chemical process and thus eliminate the liability of paint ordinarily used being washed off.

It further consists of a novel construction of a gage frame which is formed of only two parts, thereby eliminating in a large measure the possibility of any leakage at the joints.

My invention further consists of other novel features of construction, all as will be hereinafter fully set forth.

For the purpose of illustrating my invention, I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 2:
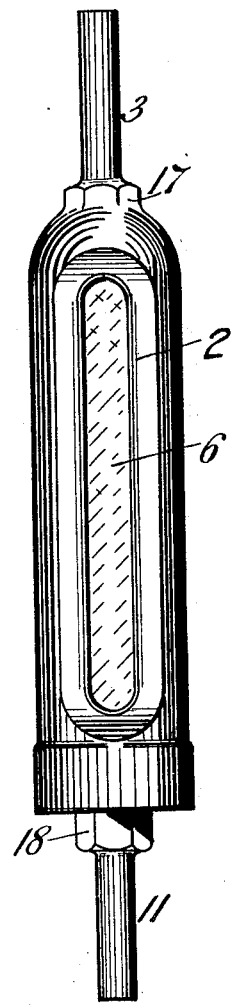

Figure 1 represents a sectional elevation of a water gage embodying my invention. Fig. 2 represents a side elevation thereof. Fig. 3 represents a section on line $x$—$x$, Fig. 1. Fig. 4 represents a sectional elevation of another embodiment of my invention wherein a plurality of gage glasses are employed. Fig. 5 represents a section on line $y$—$y$, Fig. 4. Fig. 6 represents a side elevation of the embodiment seen in Fig. 4.

Similar numerals of reference indicate corresponding parts in the figures.

Referring to the drawings:—My novel construction of water gage frame comprises in the present instance two independent members, as will be readily understood by reference to the drawings.

1 designates the water gage frame proper which is provided with a side opening 2, one end of the frame having the apertured extension 3, through which the fluid is adapted to pass. The frame 1 in proximity to the side opening 2 is interiorly recessed, as is indicated at 4, thereby adapting the same to receive the packing or gasket 5, against which the front edges of the gage glass 6 are adapted to abut, said gage glass being maintained in position against the gasket 5 by yielding means 7, which abut against the walls of a recess 8 and also engage the rear face of the gage glass 6.

Any desired type of yielding means may be employed but for purposes of illustration I have preferred to show yielding means 7 as consisting of a spring, the lower end of which is adapted to be seated in the counterbore or annular groove 9 located, in the present instance, at the inner end of a closure 10, which latter is provided with an aperture 11 therethrough communicating with the interior of the frame 1.

The closure 10 has threaded or other engagement with the lower end of the water gage frame 1, whereby when the closure 10 is assembled with respect to the gage frame 1, the free end of the resilient member 7 in the present instance will abut against the shoulder 12 formed by the recess 8, it being of course understood that a suitable gasket or packing 13 is provided, whereby a fluid tight joint is produced. The frame 1 is provided with a recess 14 at the back of the gage glass and the frame 1 is also recessed in order to form recesses 15 on opposite sides of the gage glass, whereby the top, bottom, sides and back of the gage glass are immersed in the fluid or in contact with the water or steam.

In order that the gage glass may be readily inserted in position, one end of the frame 1 is bored out, as indicated at 16. A portion of the gage glass casing 1 is provided with flats or otherwise adapted to receive a suitable tool for placing the same in position, as indicated at 17, and the closure 10 is preferably given a suitable contour, such as for example, is seen at 18, whereby the same may receive a suitable wrench or other implement.

In the embodiments seen in Figs. 4, 5 and 6 I have shown my novel construction of water gage as provided with a plurality of side openings and a plurality of gage glasses, the gage glasses being retained in assembled position by yielding means which co-act therewith in a novel manner. In this embodiment 19 designates the gage frame which is provided with a plurality of sight openings such as 20 and 21, the sight opening 20 having therefor a gage glass 22 which abuts against the packing 23 seated in the recess 24. The sight opening 21 is provided in a similar manner with a gage glass 25 which co-acts with a packing 26 seated in a recess 27. In this embodiment resilient means is employed intermediate the two gage glasses 22 and 25 for maintaining the same in their assembled position and in the present instance for purpose of illustration I show a resilient member 28, one end of which is adapted to interlock with the gage frame 19, and in the present instance I have shown this as being accomplished by providing a recess 29 with which the upper end of the member 28 co-acts, while the lower end of said member is seated in the counter-bore 30 of the closure 31, which latter is secured with respect to the gage frame 19 in any desired manner. The resilient means 28 preferably consists of a single spring member or its equivalent which extends transversely across the full width of the gage glasses and such spring or its equivalent is of colored material preferably black, in order to form a back ground for the side openings.

It will now be apparent that in a gage glass constructed in accordance with my invention, all of the gage glass will be submerged except the small portion bounded by the opening in the gage frame, which indicates the water level. The covering of such a large portion of the gage glass in the manner described causes the entire body of the gage glass to be heated uniformly when the steam is being generated. This uniform heating of the gage glass causes a uniform expansion of the glass and eliminates the danger of sudden fracture due to non-uniform expansion.

In so far as I am aware, I am the first in the art to employ a water gage frame, wherein the means employed for retaining the water gage glass in position is yielding means engaging the back of the water glass and causing the front face thereof to be pressed against a seat, whereby the yielding means will serve to retain the gage glass in position and prevent any leakage of water when the water becomes cooled and to resist atmospheric pressure when a vacuum exists in a boiler, and it will be apparent that when the steam pressure is raised, the pressure on the gasket will increase in proportion to the increase of the steam pressure and there will be no liability of any leakage at the highest steam pressure. This condition of easy expansion can never be obtained with a bolted or wedged joint, since whatever pressure is necessary to keep the glass steam tight must be exerted at all times against the gasket, otherwise leakage would occur.

In making up the joint in other gage frames with which I am familiar, it requires exceptional skill to distribute the pressure evenly over the gasket, and even in the hands of the most expert workmen the breakage of the glasses immediately after the gage glass is put under pressure is very great, due to the impossibility even when exercising the greatest care to secure a uniform pressure over the joint between the gage glass and the gasket. Where in other constructions two gaskets are required to make up the joint, in my construction only one is required. In making up the joint, the gasket 5 is inserted through the aperture 16 and placed in the recess 4. The gage glass 6 is then inserted through the opening 16 and placed against the gasket 5, after which the resilient means 7 is passed through the opening 16 and placed in assembled position. The resilient means 7 is so constructed that the corrugation of the resilient means which abuts against the shoulder 12 is of greater height than the corrugation which abuts against the closure 10 when said resilient means are not in assembled position with respect to the casing; in other words the resilient means is a tapered member and when in position extends beyond the face against which the gasket 13 is seated. The distance this extends beyond the shoulder is regulated by the amount of compression required to bring the tapered resilient means in contact against the back of the glass for the entire distance.

The use of a tapered resilient means is of special importance as a means of uniform thickness would tend to bind at the end nearest the closure, and owing to the friction between the resilient means and the back of the glass would prevent the compression from acting on the entire length of the resilient means.

After the resilient means has been placed in position as noted with the end extending beyond the shoulder, the gasket 13 is placed in assembled position and the closure 10 is brought in threaded or other engagement with the gage frame 1 and advances against the end of the resilient means 7, thereby compressing the same against the back of the gage glass 6 and against the recess 8, thereby clamping the gage firmly against the gasket 5. It is to be understood that the closure 10 is advanced until it is clamped against the gasket 13, thereby sealing the lower end from leakage.

It would be readily seen that to make the joint in my novel construction requires no skill and the danger of the non-uniform bolting effect of prior devices is entirely eliminated.

If desired, the gage frame may be made of steel and under such conditions it is preferably covered with a non-oxidizing coating and if desired this non-oxidizable coating may be produced by copperplating the steel and nickeling thereover.

I wish to call special attention to the fact that my present construction of gage frame comprises only two parts and the necessity of employing fastening devices, such as bolts, wedges, screws or their equivalents has been entirely eliminated, since only two parts are employed which are in threaded or other engagement with each other. It is further to be noted that the pressure on the spring may be varied, as desired, by adjusting the relative position of the closure 10 with respect to the frame 1, it being of course understood that the packing or gasket 13 may have any desired thickness given thereto.

In the present instance, for purposes of illustration I have preferred to show the spring 7 as consisting of a spring having a corrugated form, but it will of course be apparent that in the broad principle of my invention any type of yielding means may be employed.

The resilient means 7 employed preferably engages the back of the gage glass in alinement with the gaskets, with which the front edges of the gage glass co-act.

It will be apparent that in Figs. 1 to 3 inclusive the resilient means employed is slotted or apertured the full length of the side opening, while in the embodiment seen in Figs. 4, 5 and 6 the resilient means employed is unslotted and forms a background for the side opening.

It will now be apparent that I have devised a novel and useful construction of a water gage which embodies the features of advantage enumerated as desirable in the statement of the invention and the above description, and while I have in the present instance shown and described a preferred embodiment thereof which has been found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. In a fluid gage, the combination with a frame having a sight opening therein and fluid admission and discharge passages, of a gasket in proximity to the sight opening, a glass engaging said gasket, and a spring for causing such engagement.

2. In a fluid gage, a two part frame, one part having a sight opening therein, a gasket for said opening, a glass engaging said gasket and having its top, bottom and rear faces exposed to the fluid, and yielding means having a variable degree of compressibility throughout its length co-acting with the rear face of the glass to cause its engagement with its gasket, the degree of compressibility of said means being controlled by the other of said parts.

3. In a fluid gage, a two part frame, one part having a sight opening therein, a gasket for said opening, a glass engaging said gasket and having its top, bottom and rear faces exposed to the fluid, yielding means having a variable degree of compressibility throughout its length co-acting with the rear face of the glass to cause its engagement with its gasket, the degree of compressibility of said means being controlled by the other of said parts, and sealing material intermediate the two parts of the frame.

4. In a fluid gage, the combination with a frame having a sight opening therein and fluid admission and discharge passages, and provided with a seat in proximity to said sight opening, of a gasket in said seat, a glass engaging said gasket, and a metallic spring coacting with the back of the gage glass for retaining the same in assembled position against said seat.

5. In a fluid gage, the combination with a frame having a sight opening therein, a gasket in proximity to the sight opening, a glass engaging said gasket, said gage frame having a recess in rear of said glass, yielding means located in said recess for causing said glass to engage its gasket, and a closure for one end of said frame, said closure also serving to adjust the compression of said yielding means.

6. In a fluid gage, a frame consisting of a body portion and a closure, the body portion having a sight opening therein, a gasket surrounding said sight opening, a glass engaging said gasket, and a spring for causing the engagement of said glass with its gasket, the compression of said spring being controlled by said closure.

7. In a fluid gage, the combination of a two part frame consisting of a body portion and a closure, the body portion having a sight opening therein, a gasket surrounding said sight opening and having an apertured portion in alinement with the sight opening, a glass engaging said gasket and in alinement with the sight opening, a spring in rear of said glass and having a slot in alinement with the gage glass and sight opening, said closure forming the means for causing said spring to co-act with said glass, and packing material intermediate the closure and body portion.

8. In a fluid gage, a two part frame consisting of a body portion and a closure, the body portion having a sight opening therein and being provided with an aperture extending longitudinally therethrough, a gasket in proximity to the sight opening, a gage glass co-acting with said gasket and of less width than said longitudinal aperture, whereby the top, bottom and rear faces of the gage glass are exposed to the fluid, and yielding means co-acting with the glass for causing its engagement with its gasket.

9. In a fluid gage, a frame consisting of a body portion and a closure, each being provided with longitudinally extending apertures therethrough, the body portion having a sight opening therein, a gasket surrounding said sight opening, a glass engaging said gasket and in alinement with the sight opening, a spring located in rear of said gage glass and co-acting with the back thereof, said spring having an opening therein coinciding with said sight opening and said frame having an internal recess in rear of said spring in alinement with the opening in said spring and in alinement with the sight opening and adapted to form a background for the latter.

10. In a fluid gage, a frame consisting of a body portion and a closure, each of which has an aperture therethrough, said body portion having a sight opening therein, a gasket in proximity to said sight opening, a gage glass engaging said gasket and having its top, bottom and rear faces exposed to the fluid, and means having a non-uniform degree of compressibility throughout its length located within the body portion and co-acting with the glass for causing its engagement with its gasket, said closure co-acting with said means to equalize the pressure due to the compression throughout its length of such means.

11. In a fluid gage, a frame having a sight opening therein, a gasket in proximity to said opening, a glass engaging said gasket and having its top, bottom and rear faces exposed to the fluid, a spring engaging the glass, one end of said spring abutting against said frame, a closure for said frame against which the opposite end of said spring abuts, and sealing material intermediate said frame and closure.

12. In a fluid gage, a frame having a sight opening therein, a gasket surrounding said opening, a glass engaging said gasket and having its top, bottom and rear faces exposed to the fluid, yielding means co-acting with the back of said gage glass throughout its length for causing said glass to form a fluid-tight joint with its seat, a closure for said frame having means adapted to interlock with said yielding means, and sealing material intermediate said closure and frame.

13. In a fluid gage subjected to steam pressure, a frame with a sight opening, a gasket for the opening, a glass engaging the gasket, and exposed to the steam, and a spring engaging the glass and of sufficient strength to seal the joint under low pressure of the fluid, the frame having means for permitting the steam to act against the glass to seal the joint when the pressure rises.

14. In a fluid gage, the combination with a frame having a sight opening therein and fluid admission and discharge passages, of a glass for said opening, and a spring for maintaining said glass in fluid tight engagement with the walls of said opening.

15. The combination in a fluid gage, of a frame having a sight opening and fluid admission and discharge passages, a glass contained wholly within the frame, and yielding means for maintaining said glass yieldably in position with respect to the walls of said opening.

16. The combination in a fluid gage, of a frame having a sight opening, a glass contained wholly within the frame and against which the pressure of the fluid is exerted to maintain the glass in fluid tight engagement with the walls of the opening, under high fluid pressures, and yielding means for maintaining said glass yieldably in position with respect to the walls of the opening under low fluid pressures.

17. The combination in a fluid gage, of a frame having a passage therethrough and adapted to be connected with a fluid supply and provided with a sight opening, a gasket engaging the walls of said sight opening, a glass for closing said opening and contained wholly within the frame and against which the pressure of the fluid within the frame is exerted to maintain the glass in sealed position under high fluid pressures, yielding means independent of said gasket for maintaining the glass in sealed position under low fluid pressures, and devices for varying the tension of said yielding means.

18. The combination in a fluid gage, of a frame having a passage therethrough and adapted to be connected with a fluid supply and provided with a sight opening, a gasket engaging the walls of said sight opening, a glass for closing said opening and contained wholly within the frame and against which the pressure of the fluid within the frame is exerted to maintain the glass in sealed position under high fluid pressures, yielding means independent of said gasket for maintaining the glass in sealed position under low fluid pressures, and devices exterior of the frame for varying the tension of said yielding means without removing the gage from its fittings.

19. In a fluid gage, a casing provided with a sight opening, a glass for said sight opening, resilient means for maintaining the glass in assembled position, an adjusting device for said means, and mechanism for preventing leakage in proximity to the adjusting device.

20. In a fluid gage, a casing provided with a sight opening, a glass for said opening and a single spring within the casing and in rear of the glass for maintaining the latter in position.

21. The combination in a fluid gage, of a casing having a passage therethrough and provided with a sight opening, a glass for the sight opening, the rear wall of said passage forming a back ground for the sight opening, and a single spring for maintaining the glass in position.

22. In a fluid gage, a frame having a sight opening and an end opening, a glass insertible through the end opening and covering said sight opening, a removable apertured closure for said end opening, the aperture in said closure being in communication with the source of fluid supply, and means to secure said glass in sealed condition with the frame.

23. In a fluid gage, a frame having a sight opening, a glass for said sight opening, and having its sides and ends subjected to the pressure of the fluid within the frame, and means to secure the glass in sealed condition with the frame.

24. In a fluid gage, a frame having a sight opening, a glass covering said sight opening and having its sides and ends subjected to the pressure of the fluid within the frame, and yielding means for securing the glass in sealed condition with the frame.

25. In a fluid gage, a frame having a sight opening and an end opening, a glass covering said sight opening and having its sides and ends subjected to the pressure of the fluid within the frame, means for securing the glass in sealed condition with the frame and a removable closure for said end opening.

26. In a fluid gage, a frame having a sight opening and a seat, a glass covering said opening, sealing means between the front face of said glass and said seat to prevent leakage of fluid contained within the frame and surrounding the sides and ends of the glass, and means to secure the glass in position.

27. A gage comprising, in combination, a casing, having provision for connection with fluid conducting means, transparent means for disclosing the level of a liquid in said casing, and means including a spring for yieldably securing said transparent means to said casing.

28. A gage comprising, in combination, a fluid casing having provision for connection with fluid conducting means, and an aperture, transparent means over said aperture, and means for securing said transparent means to said casing including spring means and means for tensioning the same.

CLARENCE B. GROFF.

Witnesses:
H. S. FAIRBANKS,
C. D. McVAY.